May 15, 1928.　　　　　　　　　　　　　　　　1,670,047
W. J. PLEWS
METHOD OF MAKING BATTERY PLATES
Original Filed June 27, 1921　　2 Sheets-Sheet 1
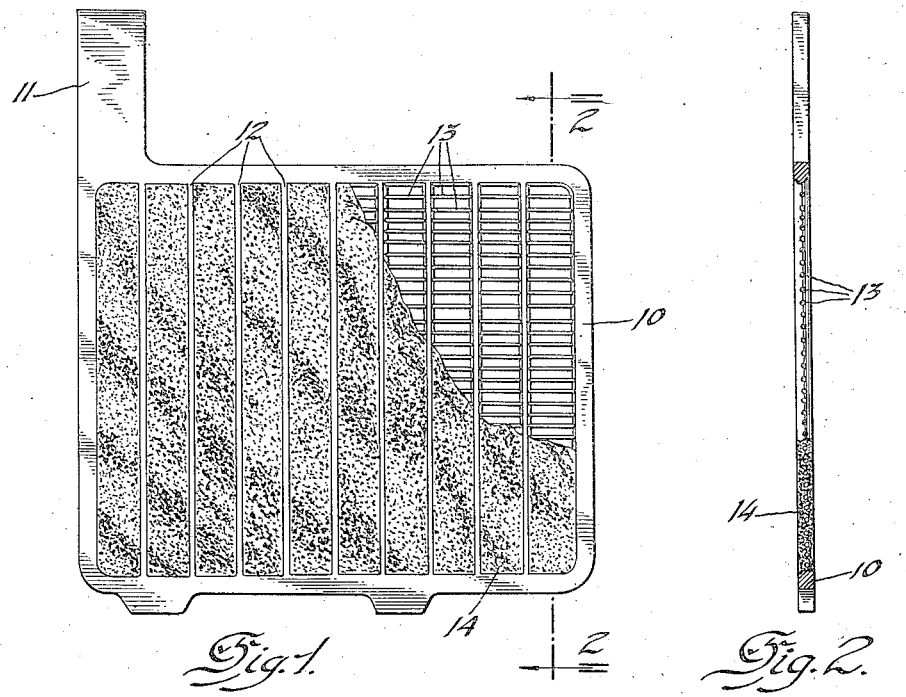
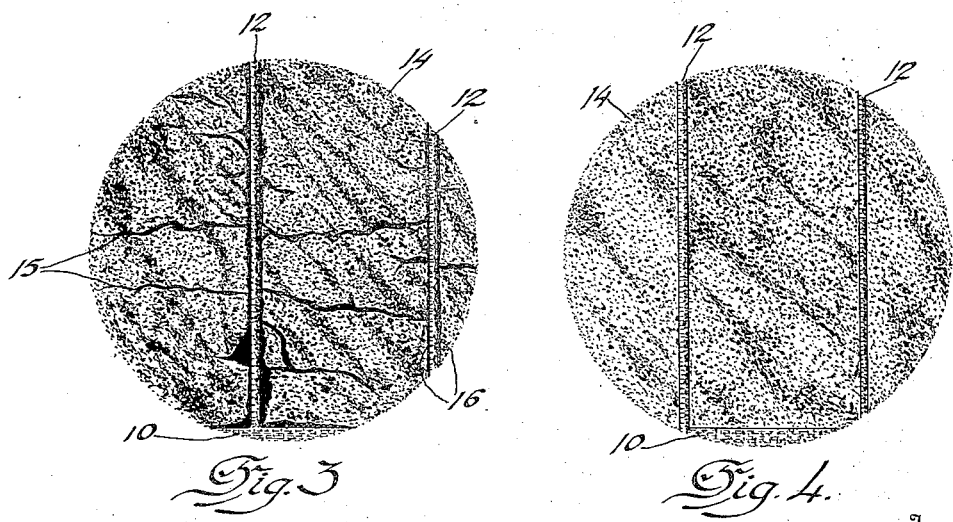
Inventor
William J. Plews
By Blackmore, Spencer & Flint
Attorneys May 15, 1928.
W. J. PLEWS
1,670,047
METHOD OF MAKING BATTERY PLATES
Original Filed June 27, 1921   2 Sheets-Sheet 2
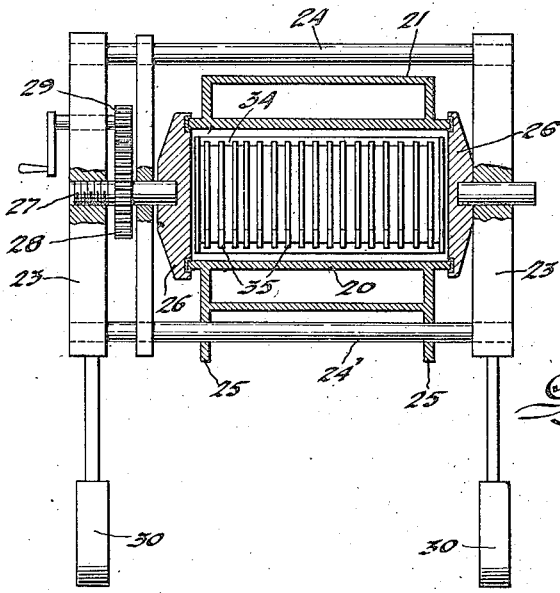
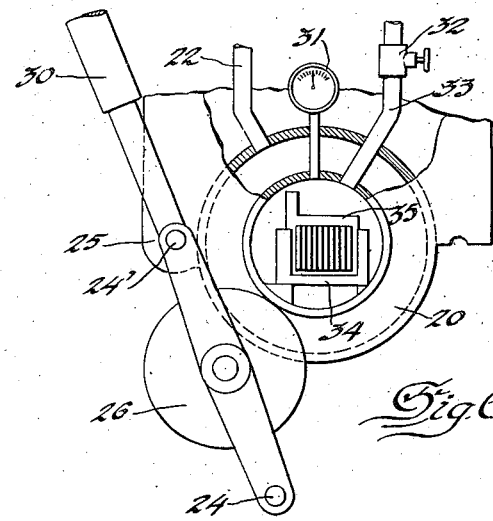
Inventor
William J. Plews Patented May 15, 1928.

1,670,047

UNITED STATES PATENT OFFICE.

WILLIAM J. PLEWS, OF NEW YORK, N. Y., ASSIGNOR, BY DIRECT AND MESNE ASSIGNMENTS, TO PLEWS & HUTCHINSON CORPORATION, OF JERSEY CITY, NEW JERSEY, A CORPORATION OF NEW JERSEY.

METHOD OF MAKING BATTERY PLATES.

Original application filed June 27, 1921, Serial No. 480,728. Divided and this application filed December 29, 1927. Serial No. 243,338.

The invention relates to electric storage batteries, especially those of the lead-sulphuric-acid type, and is more particularly concerned with the plates or bodies comprising the active material employed in such batteries and the processes of preparing the same.

In the manufacture of lead storage battery plates of the "pasted" or Faure type, it is customary to apply to a support or grid a paste comprising, generally, certain lead oxides and sulphuric acid, after which the plate so obtained is subjected to a drying operation whereby the active material becomes hardened or set. The time required for this operation varies with the temperature applied, but in the processes hitherto generally employed comprises not less than a day. Aside from the loss of time involved, the exposure of the pasted plates to the drying operation results in the formation of numerous cracks in the body of the material due to shrinkage, especially adjacent to the bars of the support or grid when a support of the grid type is employed. These cracks are generally visible to the naked eye and may be readily discovered in surprisingly large numbers under a slight magnification.

Furthermore the plates subjected to the usual drying operation by exposure to air exhibit considerable non-uniformity in physical and chemical characteristics within their mass, inasmuch as the shrinkage incident to the drying operation causes a loss in porosity varying in different portions of the mass and the slow progress of the reaction and gradual evaporation of electrolyte from the exposed surface result in unequal distribution of sulphate or other products of reaction. Differences are therefore produced in electrical resistance and variations in the ease of access of the electrolyte to the active material and its resulting action thereon.

The principal object of my invention, therefore, is to provide a method whereby the time required for the "drying" or setting of pasted battery plates may be very greatly reduced with a very material improvement in the quality of the product.

A further object is the production of a pasted battery plate of highly porous and homogeneous structure whereby the further operations to be performed may be facilitated and which plate shall possess highly enhanced properties in the way of capacity and durability.

Other objects and advantages will appear from the following description taken in connection with the accompanying drawings, in which Fig. 1 is an elevation of a battery plate embodying my invention;

Fig. 2 is a vertical section on line 2—2 of Fig. 1;

Fig. 3 is a greatly enlarged elevation of a portion of a plate showing the defects produced by air drying in a mixture otherwise identical with that shown in Fig. 1;

Fig. 4 is a view upon the same scale as Fig. 3 showing a portion of the plate of Fig. 1 ;

Fig. 5 is a view in horizontal section of a form of apparatus adapted for use in carrying out the process of my invention; and Fig. 6 is a side elevation, partly in section, of the apparatus of Fig. 5.

In carrying out my improved process for the manufacture of plates, a suitable quantity of material, comprising preferably for the negative plate litharge and for the positive plate litharge and red lead, is mixed with sufficient electrolyte to form a paste capable of being applied to the support or grid and retained therein. After the paste has been applied to the grids the latter are placed in a chamber or receptacle adapted to be closed tightly and to withstand internal pressure.

When the grids containing the soft paste have been placed within the chamber and the latter has been closed, a suitable fluid medium under pressure is admitted and the temperature is raised. As a convenient means of applying the desired temperature and pressure, I employ preferably a heated fluid pressure medium, for example, steam. Other heated gases may be used, where preferable, as, for example, exhaust from an internal combustion engine. It may even be desirable, in some cases, to use a gas of special properties, as a gas inert with reference to some paste ingredient.

The temperature may vary with the time during which the treatment is continued, the time required decreasing with increase in temperature. The pressure should be sufficient to prevent evaporation of the electrolyte such as might result in shrinkage of the paste or the vaporization of the water in the paste at the temperature utilized. In other words, the pressure employed, when the substance whose vaporization is to be prevented is water, is in excess of the vapor pressure or tension of the water at the temperature of the material in the plates. In practice, in utilizing an electrolyte consisting of dilute sulphuric acid, I have obtained satisfactory results with the use of steam at a pressure of 120 to 150 pounds, some superheat being employed so that the temperature is above 500° F. At this temperature it is possible to complete the "setting" of the plates in approximately one minute. When the pressure is relieved and the plates are removed from the chamber, the paste is found to be hardened and partially dried. The heating may be carried to such a point that the water within the paste will be substantially completely vaporized when the pressure is relieved, but when the battery elements are to be further treated preparatory to use in a cell, the drying per se may be merely an incident, the setting or hardening being believed to be due primarily to the reaction between the oxide or oxides and the electrolyte present in the paste.

It will be noted that not only is the setting completed in a very brief time, but the hardening compound formed, whatever its character, is necessarily distributed very uniformly throughout the mass. Furthermore, the retention of the water or other vaporizable material in the paste by reason of the high pressure while the setting proceeds results in the formation of a mass of active material of highly porous structure, no perceptible shrinkage being possible before the setting has been completed. As a further result, the formation of cracks in the active material is entirely eliminated, examination even with a microscope failing to disclose the presence of cracks.

Referring to the drawings, I have shown in Figs. 1 to 4 a support upon which the paste may be mounted in accordance with the improved process. This support, which may be of the usual lead-antimony alloy, comprises a frame 10 having the usual conductor lug 11, opposite sides of the frame being connected by ribs 12 which may be of diamond shape in cross-section and are preferably flush with the sides of the frame to sub-divide somewhat the surface of the active material and serve as a guide in pasting. These ribs, shown as parallel and vertical in the normal position of the plate, may, of course, be variously arranged in horizontal, oblique, or intersecting lines without affecting the general character of the plate. In the central plane of the plate, in such position as to be preferably wholly embedded within the active material, is a grill, a type of which is shown as comprising parallel wires or rods 13 transverse to the ribs 12. The size, shape and arrangement of the elements of this embedded grill may also be widely varied, of course, without affecting its essential characteristics, the important feature being the provision of an embedded grill of ample supporting and conducting capacity and presenting on the surface exposed directly to the free electrolyte the minimum practicable area. The active material 14 mounted upon the support may be of composition appropriate for either positive or negative plates and its appearance so far as shown on the drawings is the same whether the plate be freshly pasted and dried or be charged or formed of materials similar to those in a charged plate and subsequently dehydrated.

The features of the embedded support as described above have been shown in the art for many years and their advantages have been well recognized, but it has been found impracticable to utilize supports of this type without special provision for the retention of the active material either by grid bars on the surface or by external plates or the like. The necessity for such retaining means may be recognized by reference to Fig. 3, which is a facsimile of a photograph of a plate prepared with a paste supposed to be especially adaptable to the air-drying process, and identical with the paste employed in the plate of which Fig. 4 represents a section treated by my dehydrating process. The transverse cracks as at 15, and the shrinking of the material away from the ribs, as at 16, obviously render the plate liable to rapid disintegration besides greatly increasing the internal resistance and decreasing the capacity and the uniformity of chemical action. These defects are, of course, much more pronounced with this form of grid than they would be were the grid sub-divided by surface bars into numerous relatively restricted pellet areas, since, with the grid shown, a single pellet extends from top to bottom of the plate. In the plate treated by my process, however, as illustrated in Figs. 1 and 4, since no shrinkage occurs, the surface area of a pellet may be increased at will, the material remaining entirely uniform in physical texture and in actual contact with the whole surface of the support to which it was originally applied. As a result I am enabled to increase materially the active surface, and hence the capacity, for a given size of plate, and also to increase the conductivity, while protecting the grid from exposure to the electrolyte and adding to the life of the plate.

The high and uniform porosity and uniform distribution of active materials also contribute to rapid penetration and diffusion of electrolyte with the attendant advantages of increased capacity, particularly at high rates of discharge, as well as permitting the changes of mass incident to use without the shedding that usually occurs. It has also been found that the "forming" operation by treatment with an electric current may be carried on more rapidly and completed more quickly than with plates prepared by the usual processes.

The process of dehydrating the plates by subjection to heat under elevated pressure is applicable at any stage in the manufacture of the plates where it may be desirable to remove moisture without the chemical or physical changes which might accompany drying at low or atmospheric pressures. It has been found possible, for example, to dry completely charged plates so quickly that change in the chemical constitution of the active material, as oxidation by reason of exposure to air, does not occur to any material extent. So-called "charged" plates may accordingly be dried and shipped or stored for an indefinite period with very little change in the active material. Similarly, plates prepared from materials so treated as to simulate the chemical characteristics of a "charged" plate, and therefore capable of use in a cell without previous subjection to the action of an electric current, may be dehydrated with very slight change in the active material. My invention as claimed in this particular application, however, has to do with the treatment of freshly pasted plates to accomplish the setting of the paste and to dry them, and is a division of a prior application filed by me upon June 27, 1921, Serial No. 480,728, for battery plates and method of making the same, and in which application my invention is claimed as applied to battery plates generally, irrespective of whether they are freshly pasted plates, charged negative plates, or positive plates if it be desired to treat them; and claimed specifically as applied to the treatment of charged negative plates.

Heretofore in processes having as a result or end to be attained the drying of charged battery plates, particularly the drying of charged negative plates which will oxidize rapidly if air comes into contact with them, it has been proposed to subject the plates to steam in a chamber at a temperature of from 250 to 300 degrees F., the plates being treated from two to three hours. In the improved process wherein my invention consists, however, and in addition to other particular steps hereinbefore referred to and hereinafter claimed, the time necessary for the drying of the plates is reduced from the two or three hour period referred to, to a period of a very few minutes, the heat treatment in my process being for a short time as compared to the two or three hour treatment. Necessarily the time of treatment varies under different conditions, that is differs with the temperature of the gaseous medium made use of, with the water content of the plates, with the physical, chemical and other properties of the plates, and with other characteristics thereof. The treatment, however, is always for a comparatively short period and, as hereinbefore expressed, the time of treatment may be reduced to a period well under five minutes under favorable circumstances.

In Figs. 5 and 6 is shown one form of apparatus suitable for carrying out the dehydrating step of my process. This apparatus comprises a cylindrical container 20 suitably insulated as by the jacket 21 having a pipe connection 22 for the supply of a heating medium, such, for example, as exhaust or flue gases from a heater employed for generating the pressure medium for application to the plates. A frame comprising side bars 23, 23', connected by rods 24, 24', the rod 24' being pivotally supported in the frame 25, carries covers 26, 26' for the ends of the cylinder. One cover, as 26' may be mounted upon a shaft 27 having screw threaded engagement with the bar 23' and rotatable by gears 28, 29. The covers may thus be forcibly applied to the ends of the cylinder to render the same gas tight, or, after being released therefrom, may be swung away from the cylinder as shown in Fig. 6, the movement being facilitated by counterweights 30. A pressure gage 31 may be provided for the cylinder and the supply of heating and pressure medium may be controlled by valve means 32 in the supply pipe 33. A suitable support in the nature of a rack or tray 34 for the plates 35 may be used to facilitate insertion into or removal from the cylinder.

It will be understood that the invention is in no way limited to the use of any particular form of mechanism in carrying out the process steps thereof and, furthermore, that the details of procedure may be considerably varied without departing from the scope of the invention. Hence I do not wish to be limited to the specific features of the foregoing description except as required by the language of the appended claims in view of the prior art.

Having thus described and explained my invention I claim and desire to secure by Letters Patent:

1. The process of hardening and setting the paste of freshly pasted storage battery elements which comprises the subjection of the elements to the action of a gaseous medium in direct contact therewith, and which medium is under pressure, and at a temperature sufficiently high to cause the setting to take place within a period of from one to five minutes.

2. The process of treating freshly pasted electric storage battery elements containing lead oxide and an electrolyte comprising a vaporizable liquid which consists in subjecting the elements to the action of a gaseous medium surrounding and in direct contact with them, and which is at a temperature sufficiently high to accelerate the reaction between the oxide and the electrolyte, for a period not exceeding ten minutes.

3. In a process of treating freshly pasted electric storage battery elements for accelerating a chemical change therein, the step which consists in raising the temperature of the elements and at the same time restraining vaporization of a liquid present in the elements, by subjecting them to the action of a heated gaseous medium in direct contact therewith, and which medium is under a pressure sufficiently high to prevent vaporization of the said liquid, for a short time as compared with two or three hours.

4. The process of making an electric storage battery element which comprises applying to a support a paste containing lead oxide and dilute sulphuric acid, and setting the paste by heating the same to a temperature substantially above 212° F. by a heated gaseous medium under pressure and in direct contact therewith, for a period not exceeding ten minutes.

5. The process of treating wet electric storage battery elements of the pasted type which comprises the subjection of wet freshly pasted elements to the action of steam in direct contact with them, and for a period not exceeding ten minutes, restraining the evaporation of liquid from said elements, during the treating period, and then relieving the pressure and permitting the liquid which wets the elements to evaporate therefrom.

6. The process of drying freshly pasted electric storage battery plates containing a liquid to be eliminated therefrom which consists in subjecting the plates to the action of a heated gaseous medium surrounding and in direct contact with them, and under pressure sufficient to restrain the passage of the liquid from the plates and into the gaseous medium, for a period not exceeding ten minutes, and then relieving the pressure and permitting the liquid to pass from the plates.

In testimony whereof I affix my signature this 21st day of December, 1927.

WILLIAM J. PLEWS.